United States Patent
Pawar et al.

(10) Patent No.: US 10,212,755 B1
(45) Date of Patent: Feb. 19, 2019

(54) WIRELESS ACCESS POINT CONTROL OF DISCONTINUOUS RECEPTION (DRX) PARAMETERS FOR USER EQUIPMENT (UE)

(71) Applicant: Sprint Communications Company L.P., Overland Park, KS (US)

(72) Inventors: Hemanth Balaji Pawar, Brambleton, VA (US); Krishna D. Sitaram, Chantilly, VA (US); Shilpa Kowdley Srinivas, Brambleton, VA (US)

(73) Assignee: Sprint Communications Company L.P., Overland Park, KS (US)

(*) Notice: Subject to any disclaimer, the term of this patent is extended or adjusted under 35 U.S.C. 154(b) by 61 days.

(21) Appl. No.: 15/457,666

(22) Filed: Mar. 13, 2017

(51) Int. Cl.
*H04B 1/00* (2006.01)
*H04W 76/28* (2018.01)
*H04W 72/08* (2009.01)

(52) U.S. Cl.
CPC ......... *H04W 76/28* (2018.02); *H04W 72/082* (2013.01)

(58) Field of Classification Search
CPC ............................ H04W 76/28; H04W 72/082
USPC ....................................................... 455/63.1
See application file for complete search history.

(56) References Cited

U.S. PATENT DOCUMENTS

| | | | |
|---|---|---|---|
| 8,238,260 B2* | 8/2012 | Terry | H04W 52/0212 370/252 |
| 9,078,220 B2 | 7/2015 | Makhlouf et al. | |
| 9,119,153 B2 | 8/2015 | Deivasigamani et al. | |
| 9,370,021 B2 | 6/2016 | Love et al. | |
| 9,491,702 B2 | 11/2016 | Dai | |
| 2008/0181127 A1 | 7/2008 | Terry et al. | |
| 2011/0141959 A1 | 6/2011 | Damnjanovic et al. | |
| 2017/0318536 A1* | 11/2017 | Manepalli | H04W 52/0245 |

FOREIGN PATENT DOCUMENTS

| | | | |
|---|---|---|---|
| EP | 2157830 | | 2/2010 |
| GB | 2498934 A | * | 8/2013 |
| WO | 2013171577 | | 11/2013 |
| WO | WO 2013/171577 | * | 11/2013 |

* cited by examiner

*Primary Examiner* — Nay A Maung
*Assistant Examiner* — Angelica M Perez (57) ABSTRACT

A wireless access point controls Discontinuous Reception (DRX) parameters for User Equipment (UE). The wireless access point wirelessly exchanges wireless communications with a plurality of UEs comprising High Power UEs (HPUEs) and non-HPUEs. The wireless access point determines a number of the HPUEs and determines a number non-HPUEs experiencing RF interference above an RF interference threshold. The wireless access point compares the number of non-HPUEs experiencing RF interference above the RF interference threshold to the number of HPUEs and when the number of non-HPUEs experiencing RF interference above the RF interference threshold exceeds the number of HPUEs, then the wireless access point modifies the DRX parameters for the HPUEs to a low DRX parameter setting. The wireless access point wirelessly transmits an instruction to the HPUEs indicating the modification of the DRX parameters for the HPUEs to the low DRX parameter setting.

14 Claims, 8 Drawing Sheets

| DRX PARAMETER SETTING | DRX BATTERY SAVINGS | DRX ON-DURATION TIMER | DRX INACTIVITY TIMER | DRX RETRANSMISSION TIMER |
|---|---|---|---|---|
| # NON-HPUES > # HPUES | LOW | HIGH | 3 SUBFRAMES | 3 SUBFRAMES | 1 SUBFRAME |
| # NON-HPUES ≤ # HPUES | MEDIUM | MEDIUM | 5 SUBFRAMES | 5 SUBFRAMES | 2 SUBFRAMES |
| # NON-HPUES = 0 | HIGH | LOW | 7 SUBFRAMES | 10 SUBFRAMES | 3 SUBFRAMES |
| # HPUES = 0 | DEFAULT | DEFAULT | 7 SUBFRAMES | 17 SUBFRAMES | 4 SUBFRAMES |

WIRELESS ACCESS POINT CONTROL OF DISCONTINUOUS RECEPTION (DRX) PARAMETERS FOR USER EQUIPMENT (UE)

TECHNICAL BACKGROUND

Wireless communication systems transfer data packets between User Equipment (UE) to provide data communication services, like internet access, voice calls, media streaming, user messaging, among other communication services. Wireless communication systems allow users to move about and communicate over the air with access communication.

Some wireless communication systems use Long Term Evolution (LTE) to exchange wireless data. LTE communication systems may be used to provide wireless signaling to the various wireless communication devices. Wireless access points, such as evolved NodeBs (eNodeBs), perform wireless networking tasks like device handovers, radio interference, management, and multipoint coordination. To facilitate these wireless networking tasks, the wireless access point communicates over signaling links with User Equipment (UE).

Wireless communication systems use Discontinuous Reception (DRX) methods to conserve battery power of a UE. Using DRX, the wireless communication system and the UE negotiate power saving mode settings for the UE receiver to be active and listen for transferred data from a wireless access point. When the UE receiver is not active and listening for data, it may enter a lower power mode to conserve battery. The negotiated power saving mode settings are generally determined based on the default protocol and typically include time interval parameter settings, such as an on-duration timer, a DRX inactivity timer, and a DRX retransmission timer.

Wireless communication systems also offer high power communication services to a set of UEs which allows the High Power UEs (HPUEs) to transmit a higher maximum output power than standard UEs. The increase in the maximum output power enables the HPUEs to increase the cell range resulting in higher coverage with a wireless access point. Although, high power communication services allow HPUEs to transmit at a higher power, this may result in high interference to other UEs exchanging data and signaling with the wireless access point and quickly drain the battery power of the HPUE. Unfortunately, current methods of controlling DRX parameters for HPUEs causing interference to non-HPUEs and draining HPUE batteries are neither efficient nor effective.

TECHNICAL OVERVIEW

A wireless access point controls Discontinuous Reception (DRX) parameters for User Equipment (UE). The wireless access point wirelessly exchanges wireless communications with a plurality of UEs comprising High Power UEs (HPUEs) and non-HPUEs. The wireless access point determines a number of the HPUEs and determines a number non-HPUEs experiencing RF interference above an RF interference threshold. The wireless access point compares the number of non-HPUEs experiencing RF interference above the RF interference threshold to the number of HPUEs and when the number of non-HPUEs experiencing RF interference above the RF interference threshold exceeds the number of HPUEs, then the wireless access point modifies DRX parameters for the HPUEs to a low DRX parameter setting. The wireless access point wirelessly transmits an instruction to the HPUEs indicating the modification of the DRX parameters for the HPUEs to the low DRX parameter setting.

DETAILED DESCRIPTION

Figure 1:
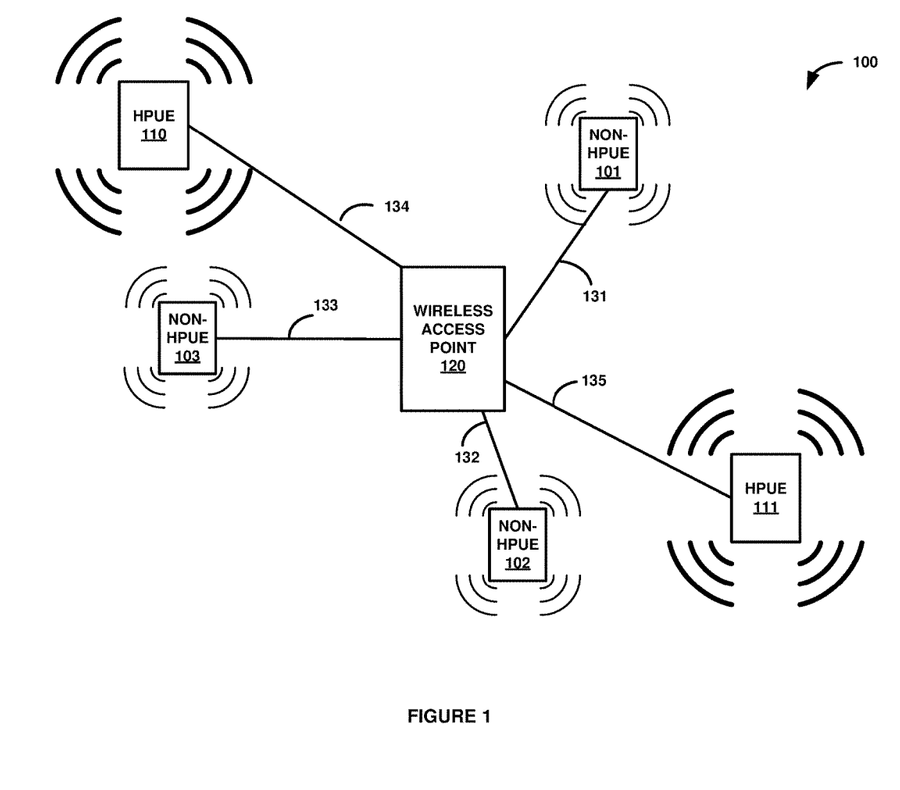
FIGS. 1-3 illustrates a wireless communication network to control Discontinuous Reception (DRX) parameters for User Equipment (UE).
Figure 2:
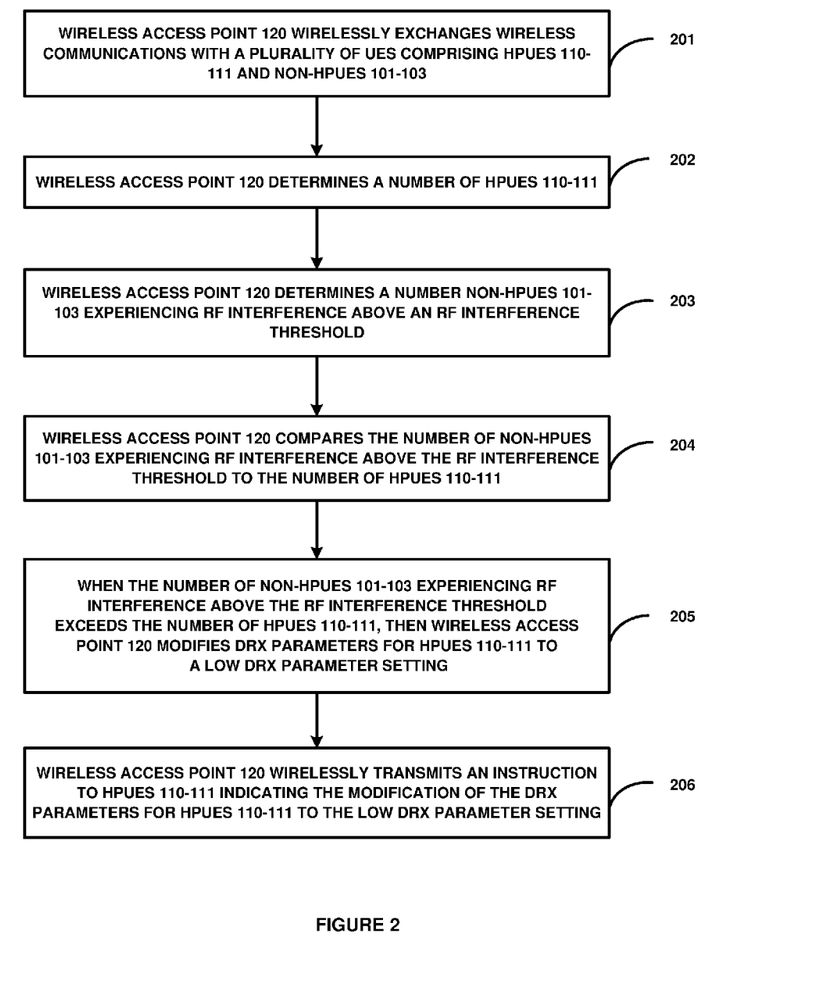
Figure 3:
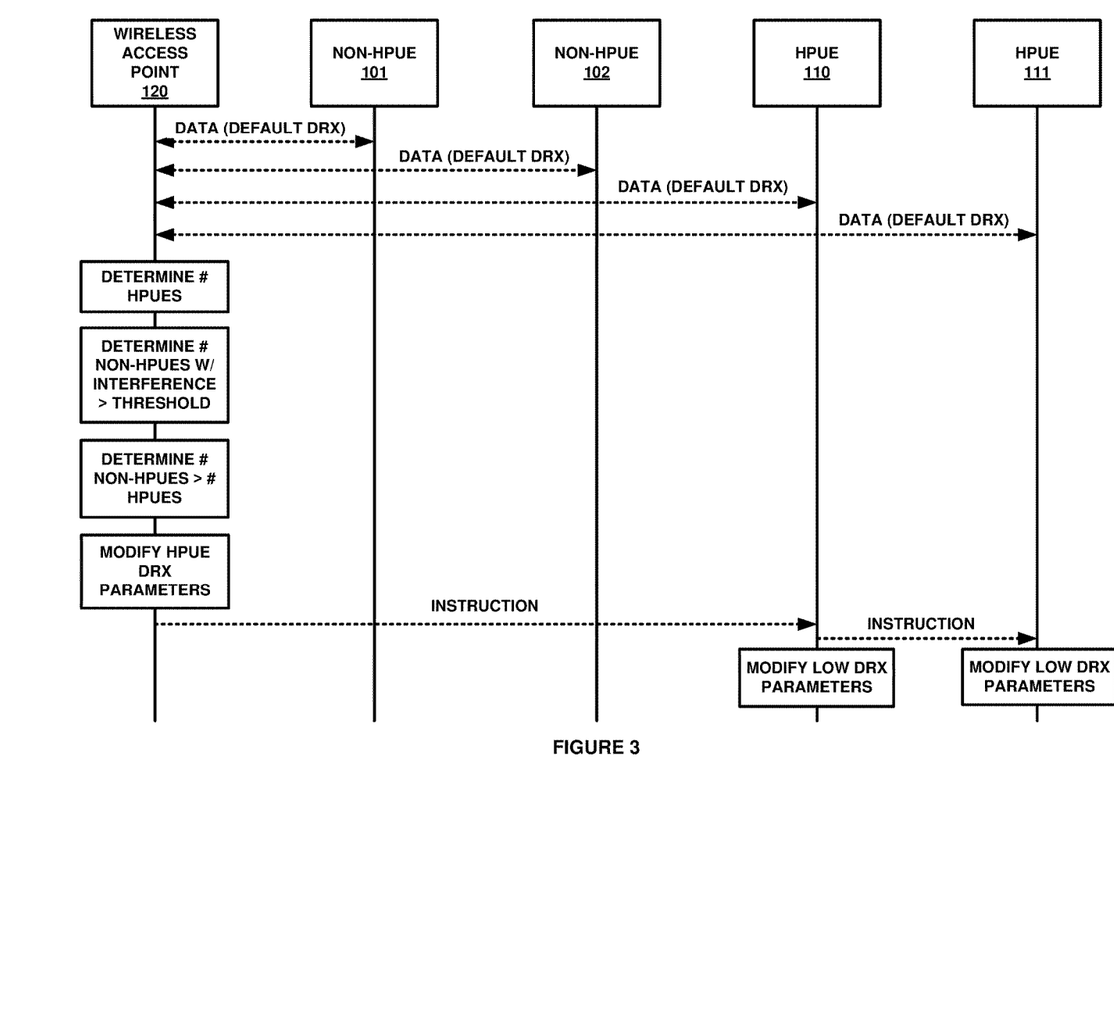

FIGS. 1-3 illustrate wireless communication system 100 to control Discontinuous Reception (DRX) parameters for User Equipment (UE). Referring to FIG. 1, wireless communication system 100 comprises High Power UEs (HPUEs) 110-111, non-HPUEs 101-103, and wireless access point 120. Non-HPUEs 101-103 communicate with wireless access point 120 over wireless links 131-133. HPUEs 110-111 communicate with wireless access point 120 over wireless links 134-135. Non-HPUEs 101-103 each include a low power coverage area indicated by the small thin arcs. HPUEs 110-111 each include a high power coverage area indicated by the large think arcs.

Non-HPUEs 101-103 and HPUEs 110-111 could each be a phone, tablet computer, media device, an intelligent machine, or some other apparatus having a wireless transceiver. Non-HPUEs 101-103 and HPUEs 110-111 each include processing circuitry and memory that store and execute various software modules. Non-HPUEs 101-103 and HPUEs 110-111 may wirelessly receive and transmit Radio Frequency (RF) signaling to attach, request services, and exchange data with wireless access point 120. HPUEs 110-111 may be further configured to transmit at a higher maximum output power than non-HPUEs 101-103.

Wireless access point 120 may comprise a macro base station, picocell base station, femtocell base station, a wireless hotspot, an evolved NodeB (eNodeB), or some other wireless access point that may provide wireless communication services to non-HPUEs 101-103 and HPUEs 110-111. Wireless access point 120 includes communication transceivers comprising antennas, amplifiers, modulators, filers, and digital signal processors. Wireless access point 120 also includes data processing circuitry, memory, and operating software to control the transceivers and server network applications.

Wireless access point 120 uses RF signaling to perform UE attachment, schedule services, and exchange data with non-HPUEs 101-103 and HPUEs 110-111. Wireless access point 120 may determine a number of non-HPUEs 101-103 and HPUEs 110-111. Wireless access point 120 is also configured to determine a number of non-HPUEs 101-103 experiencing RF interference. Wireless access point 120 is also configured to determine DRX parameters for HPUES 110-111 and transmit instructions to HPUEs 110-111 to modify DRX parameters.

Wireless communication links 130-135 use air or space as the transport media. Wireless communication links 130-135 may use various protocols, such as Long Term Evolution (LTE), Code Division Multiple Access (CDMA), Orthogonal Frequency Division Multiplexing Access (OFDMA), LTE Wireless Aggregation (LWA), Internet Protocol (IP), Evolution Data Only (EVDO), Worldwide Interoperability for Microwave Access (WIMAX), Global System for Mobile Communication (GSM), High Speed Packet Access (HSPA), or some other wireless communication format—including combinations thereof.

In operation, wireless access point 120 wirelessly exchanges wireless communications with a plurality of UEs comprising HPUEs 110-111 and non-HPUEs 101-103. Wireless access point 120 may exchange wireless communications with non-HPUEs 101-103 and HPUEs 110-111 by receiving attachment and registration data from non-HPUEs 101-103 and HPUEs 110-111 and responsively establishing signaling and data bearers with non-HPUEs 101-103 and HPUEs 110-111. Wireless access point 120 may wirelessly exchange the wireless communications with the non-HPUEs 101-103 and HPUEs 110-111 using default DRX parameters.

Non-HPUEs 101-103 and HPUEs 110-111 use DRX to conserve battery power where each of non-HPUEs 101-103 and HPUEs 110-111 negotiate power saving mode settings with wireless access point 120 for the UE receiver to be active and listen for transferred data from wireless access point 120. Many applications have long periods of inactivity in between data transmissions. Therefore, when the UE receiver is not active and listening for data, it may enter a lower power mode to conserve battery. The negotiated DRX parameter settings are generally determined based on the default protocol and typically include time interval parameter settings, such as a DRX On-Duration timer, a DRX Inactivity timer, and a DRX Retransmission timer.

The DRX On-Duration timer is the duration the UE is "ON" within one DRX time cycle. The DRX Inactivity timer specifies how long the UE receiver remains "ON" after receiving transmitted data from wireless access point 120. The transmitted data may be Physical Downlink Control Channel (PDCCH) data carrying Downlink Control Information (DCI) for the UE. The DRX Retransmission timer specifies the maximum number of consecutive PDCCH subframes the UE should remain active to wait for an incoming retransmission after the first available retransmission time.

Wireless access point 120 determines a number of HPUEs 110-111. Wireless access point 120 may track which UEs are using high power communication services within the UE group. High power communication services allow HPUEs 110-111 to transmit a higher maximum output power than standard non-HPUEs 101-103. The increase in high power output enables HPUEs 110-111 to increase the cell range resulting in higher coverage with wireless access point 120, such as increasing the cell range from a 4 km radius to an 8 km radius. HPUEs 110-111 may be enabled to use the higher maximum designated frequency band, such as band 14 using 700 MHz.

Wireless access point 120 also determines a number non-HPUEs 101-103 experiencing RF interference above an RF interference threshold. The measurement of RF interference to non-HPUEs 101-103 may comprise a Signal-to-Noise Ratio (SINR), a Reference Signal Received Power (RSRP), Reference Signal Received Quality (RSRQ), or a packet loss rate reported by each of non-HPUEs 101-103.

The RF interference threshold may be pre-determined and stored within wireless access point 120. The RF interference threshold may also be received from an external wireless network element, such as a Mobility Management Entity (MME), a Home Subscriber Subsystem (HSS), a Policy and Charging Rules Function (PCRF), or some other wireless network control element. The RF interference threshold may be stored in a database or determined dynamically by wireless network control elements or wireless access point 120.

After determining the number of HPUEs 110-111 and the number of non-HPUEs 101-103 experiencing RF interference above an RF interference threshold, wireless access point 120 compares the number of non-HPUEs 101-103 experiencing RF interference above the RF interference threshold to the number of HPUEs 110-111, and when the number of non-HPUEs 101-103 experiencing RF interference above the RF interference threshold exceeds the number of HPUEs 110-111, then wireless access point 120 modifies DRX parameters for HPUEs 110-111 to a low DRX parameter setting. The low DRX parameter setting may comprise a shorter DRX On-Duration timer, a shorter DRX Inactivity timer, a shorter DRX Retransmission timer, or any combination thereof.

In a final operation, wireless access point 120 wirelessly transmits an instruction to HPUEs 110-111 indicating the modification of the DRX parameters for HPUEs 110-111 to the low DRX parameter setting. Wireless access point 120 may wirelessly transfer the instruction to HPUEs 110-111 in a Radio Resource Control (RRC) message.

FIG. 2 is a flow diagram illustrating an operation of wireless communication system 100 to control DRX parameters for UEs. In operation, wireless access point 120 wirelessly exchanges (201) wireless communications with a plurality of UEs comprising HPUEs 110-111 and non-HPUEs 101-103. Wireless access point 120 determines (202) a number of HPUEs 110-111 and determines (203) a number non-HPUEs 101-103 experiencing RF interference above an RF interference threshold. Wireless access point 120 compares (204) the number of non-HPUEs 101-103 experiencing RF interference above the RF interference threshold to the number of HPUEs 110-111 and when the number of non-HPUEs 101-103 experiencing RF interference above the RF interference threshold exceeds the number of HPUEs 110-111, then wireless access point 120 modifies (205) DRX parameters for HPUEs 110-111 to a low DRX parameter setting. Wireless access point 120 wirelessly transmits (206) an instruction to HPUEs 110-111 indicating the modification of the DRX parameters for HPUEs 110-111 to the low DRX parameter setting.

FIG. 3 illustrates a sequence diagram of wireless communication system 100 to control DRX parameters for UEs. In operation, wireless access point 120 wirelessly exchanges wireless communications with a plurality of UEs comprising HPUEs 110-111 and non-HPUEs 101-103. For example, wireless access point 120 may exchange Voice over LTE (VoLTE) data with non-HPUE 101, internet access data with non-HPUE 102, gaming data with non-HPUE 103, text message data with HPUE 110, and video streaming data with HPUE 111. In this example, wireless access point 120 initially exchanges the wireless communications with non-HPUEs 101-103 and HPUEs 110-111 using default DRX parameters. For example, the default DRX parameters may comprise a DRX On-Duration timer of 7 subframes, a DRX Inactivity timer of 17 subframes, and a DRX Retransmission timer of 4 subframes.

Wireless access point 120 determines a number of HPUEs 110-111. Wireless access point 120 may determine the number of HPUEs 110-111 by determining a number of UEs exchanging data and signaling on a high power designated frequency band. For example, HPUEs 110-111 may be exchanging wireless communications with wireless access point 120 on band 41 using 2.4 GHz. Wireless access point 120 may also determine the number of HPUEs 110-111 by determining a number of UEs enabled to use a maximum output power higher than a standard maximum output power. For example, wireless access point 120 may determine that HPUEs 110-111 are enabled to transmit at a higher maximum output power of 31 dBm. On the other hand, non-HPUEs 101-103 are enabled to transmit at a standard maximum output power of 23 dBm.

Wireless access point 120 also determines a number non-HPUEs 101-103 experiencing RF interference above an RF interference threshold. In some examples, the RF interference for each of non-HPUEs 101-103 comprises a SINR measurement received from each of non-HPUEs 101-103. For example, wireless access point 120 may receive RF measurement reports from each of non-HPUEs 101-103 indicating SINR measurements. Wireless access point 120 then determines that a difference between the SINR measurements for each of non-HPUEs 101-103 is above an SINR measurement threshold. In other examples, the RF interference for each of non-HPUEs 101-103 comprises a packet loss rate reported by each of non-HPUEs 101-103.

In some examples, the RF interference for each of non-HPUEs 101-103 comprises an RSRP measurement reported by each of non-HPUEs 101-103. In other examples, the RF interference for each of non-HPUEs 101-103 comprises an RSRQ measurement reported by each of non-HPUEs 101-103. It should further be noted that in some scenarios, wireless access point 120 may use any combination of RF interference measurements to determine when one of non-HPUEs 101-103 is experiencing RF interference above an RF interference threshold.

In a next operation, wireless access point 120 compares the number of non-HPUEs 101-103 experiencing RF interference above the RF interference threshold to the number of HPUEs 110-111 and when the number of non-HPUEs 101-103 experiencing RF interference above the RF interference threshold exceeds the number of HPUEs 110-111, then wireless access point 120 modifies DRX parameters for HPUEs 110-111 to a low DRX parameter setting. Wireless access point 120 may modify the DRX parameters to a low DRX parameter setting by modifying at least one of a DRX On-Duration timer, the DRX Inactivity timer, the DRX Retransmission timer, or any combination thereof.

For example, wireless access point 120 may compare the number of non-HPUEs 101-103 experiencing the SINR measurement above the SINR threshold to the number of HPUEs 110-111 and determine that the three non-HPUEs 101-103 experiencing SINR measurement above the SINR threshold exceeds the number of the two HPUEs 110-111. In response, wireless access point 120 modifies the DRX On-Duration timer, the DRX Inactivity timers, and the DRX Retransmission timer to shorter durations. Advantageously, this limits RF interference to non-HPUEs 101-103 and more efficiently saves battery power for HPUEs 110-111.

Wireless access point 120 then wirelessly transmits an instruction to HPUEs 110-111 indicating the modification of the DRX parameters for HPUEs 110-111 to the low DRX parameter setting. For example, wireless access point 120 may transmit the instruction HPUEs 110-111 to modify the DRX parameters in an RRC message. HPUEs 110-111 then process the instruction and utilize the lower DRX parameter setting of the shorter DRX On-duration timer, the shorter DRX Inactivity timer, and the shorter DRX Retransmission timer for receiving subsequent data control information over the PDCCH from wireless access point 120.

In some examples, in response to wirelessly transmitting the instruction to HPUEs 110-111 indicating the modification of the DRX parameters for HPUEs 110-111 to the low DRX parameter setting, wireless access point 120 determines that the number of non-HPUEs 101-103 that are experiencing RF interference above the RF interference threshold does not exceed the number of HPUEs 110-111. In this example, wireless access point 120 then modifies the DRX parameters for HPUEs 110-111 to medium DRX parameters and wirelessly transmits an additional instruction to HPUEs 110-111 indicating the modification of the DRX parameters for HPUEs 110-111 to the medium DRX parameter settings. The medium DRX parameters may consist of longer DRX timers than the low DRX parameters, but shorter DRX timers than the default DRX timers.

In some examples, in response to wirelessly transmitting the instruction to HPUEs 110-111 indicating the modification of the DRX parameters for HPUEs 110-111 to the low DRX parameter setting, wireless access point 120 may determine that none of non-HPUEs 101-103 are experiencing RF interference above the RF interference threshold. In this example, wireless access point 120 then modifies the DRX parameters for HPUEs 110-111 to high DRX parameters and wirelessly transmits an additional instruction to HPUEs 110-111 indicating the modification of the DRX parameters for HPUEs 110-111 to the high DRX parameter settings. The high DRW parameters may consist of longer DRX timers than the medium DRX parameters, but shorter DRX timers than the default DRX timers.

In some examples, in response to wirelessly transmitting the instruction to HPUEs 110-111 indicating the modification of the DRX parameters for HPUEs 110-111 to the low DRX parameter setting, wireless access point 120 determines that none of HPUEs 110-111 are high power enabled and therefore, there are no active HPUEs. In this example, wireless access point 120 then modifies the DRX parameters for HPUEs 110-111 to default DRX parameters and wirelessly transmits an additional instruction to HPUEs 110-111 indicating the modification of the DRX parameters for HPUEs 110-111 to the default DRX parameter settings. The default DRW parameters may consist of standard DRX timers for non-HPUEs 101-103.

Figure 4:
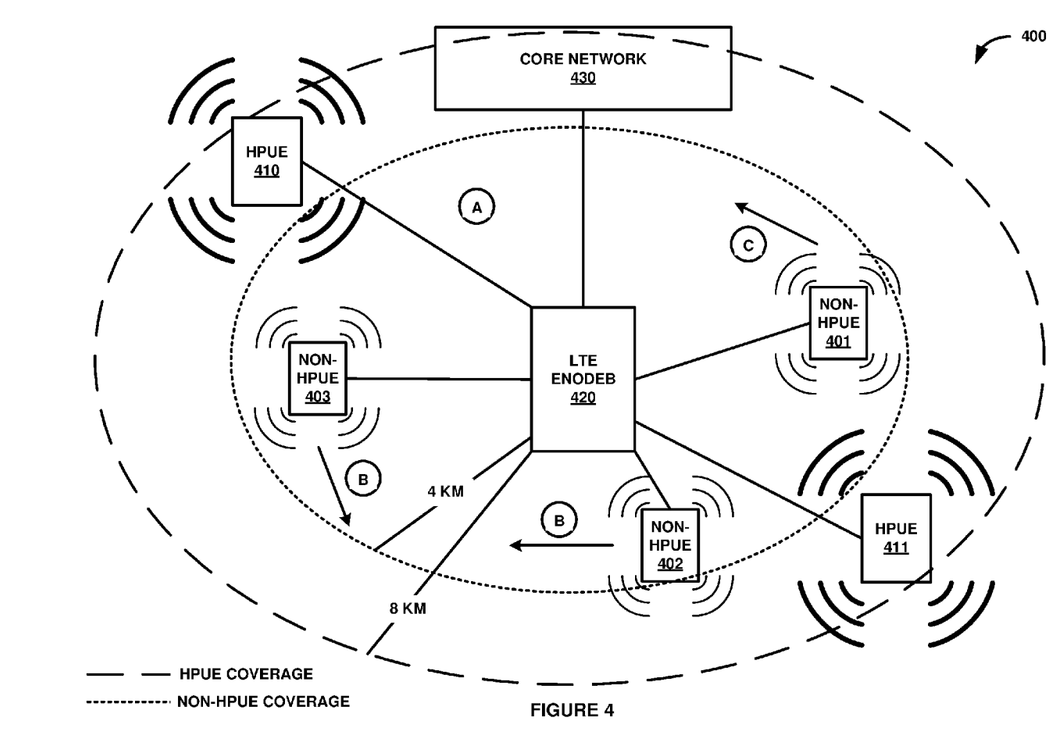
FIGS. 4-5 illustrate a Long Term Evolution (LTE) communication system to control DRX parameters for UE.

FIG. 4 illustrates LTE communication system 400 to control DRX parameters for UEs. LTE communication system 400 is an example of wireless communication system 100, although wireless communication system 100 may use alternative configurations and operations. LTE communication system 400 comprises UEs 401-403, HPUEs 410-411, LTE eNodeB 420, and LTE core network 430. It should be noted that at time A, all UEs are located as indicated in FIG. 4. However, at time B, non-HPUEs 402-403 move away from HPUEs 410-411. At time C, non-HPUE 403 moves away from HPUE 411.

Non-HPUEs 401-403 and HPUEs 410-411 are each exchanging data and signaling with LTE eNodeB 420. As indicated by the small thin arcs, non-HPUEs 401-403 each have a low maximum transmit power of 23 dBm. As indicated by the large thick lines, HPUEs 410-411 each have a high maximum transmit power of 31. It should also be noted that non-HPUEs 401-403 and HPUEs 410-411 are each initially receiving transmission data from LTE eNodeB 420 using a default DRX parameter setting. Additionally, LTE eNodeB 420 may provide wireless coverage of a 4 km radius to non-HPUEs 101-103 (as indicated by the dotted-line circle), and wireless coverage of a 8 km radius to HPUEs 110-111 (as indicated by the dashed-line circle).

Figure 5:
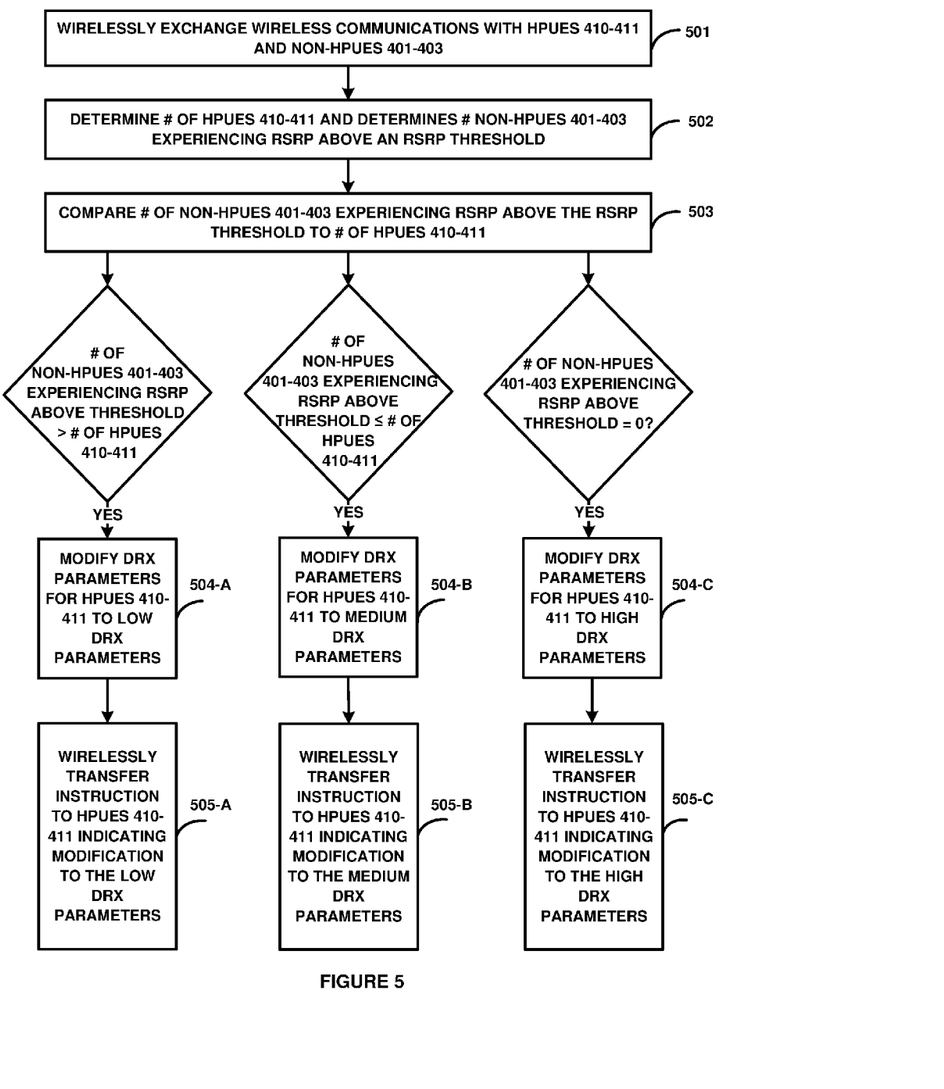

FIG. 5 illustrates an operation of LTE communication system 400 to control DRX parameters for UEs. In operation, LTE eNodeB 420 wirelessly exchanges (501) wireless communications with HPUEs 410-411 and non-HPUEs 401-403. For example, LTE eNodeB 420 may exchange VoLTE with non-HPUEs 401-403 and video streaming data with HPUEs 410-411. LTE eNodeB 420 then determines (502) a number of HPUEs 410-411. In this example, there are two HPUEs, HPUE 410 and HPUE 411. LTE eNodeB 420 also determines (502) a number non-HPUEs 401-403 experiencing RSRP measurements above an RSRP measurement threshold. In this example embodiment, the RSRP measurement for non-HPUEs 401-403 are all above the RSRP measurement threshold.

LTE eNodeB 420 then compares (503) the number of non-HPUEs 401-403 experiencing RSRP measurements above the RSRP measurement threshold to the number of HPUEs 410-411. In this example, the number of non-HPUEs 401-403 experiencing RSRP measurements above the RSRP measurement threshold exceeds the number of HPUEs 410-411. Therefore, LTE eNodeB 420 modifies (504-A) DRX parameters for HPUEs 410-411 to a low DRX parameter setting. LTE eNodeB 420 then wirelessly transmits (505-A) an instruction to HPUEs 410-411 indicating the modification of the DRX parameters for HPUEs 410-411 to the low DRX parameter setting.

At time B, in response to wirelessly transmitting the instruction to HPUE 410 and HPUE 411 to modify to the low DRX parameter setting, LTE eNodeB 420 again determines the number of HPUEs 410-411 and the number of non-HPUEs 401-403 experiencing RSRP measurements above the RSRP threshold. At this point, LTE eNodeB 420 determines that the RSRP measurement for non-HPUE 401 is again above the RSRP measurement threshold. However, the RSRP measurements for non-HPUEs 402-403 are below the RSRP measurement threshold since non-HPUEs 402-403 moved away from HPUEs 410-411. Therefore, LTE eNodeB 420 determines that the number of HPUEs 410-411 is less than the number of non-HPUEs 401-403 experiencing interference above the RSRP threshold. LTE eNodeB 420 then modifies (504-B) the DRX parameters for HPUE 410-411 to a medium DRX parameter setting and wirelessly transmits (505-B) an additional instruction to HPUE 410 and HPUE 411 to modify to the medium DRX parameter setting.

At time C, in response to wirelessly transmitting the instruction to HPUE 410 and HPUE 411 to modify to the medium DRX parameter setting, LTE eNodeB 420 again determines the number of HPUEs 410-411 and the number of non-HPUEs 401-403 experiencing RSRP measurements above the RSRP threshold. At time C, LTE eNodeB 420 determines that RSRP measurements for each of non-HPUEs 401-403 are below the RSRP measurement threshold since non-HPUE 401 moved away from HPUE 411. Therefore, LTE eNodeB 420 determines that none of HPUEs 401-403 are experiencing RSRP measurements above the RSRP measurement threshold. LTE eNodeB 420 then modifies (504-C) the DRX parameters for HPUE 410-411 to a high DRX parameter setting and wirelessly transmits (505-C) an additional instruction to HPUE 410 and HPUE 411 to modify to the high DRX parameter setting.

Figure 6:
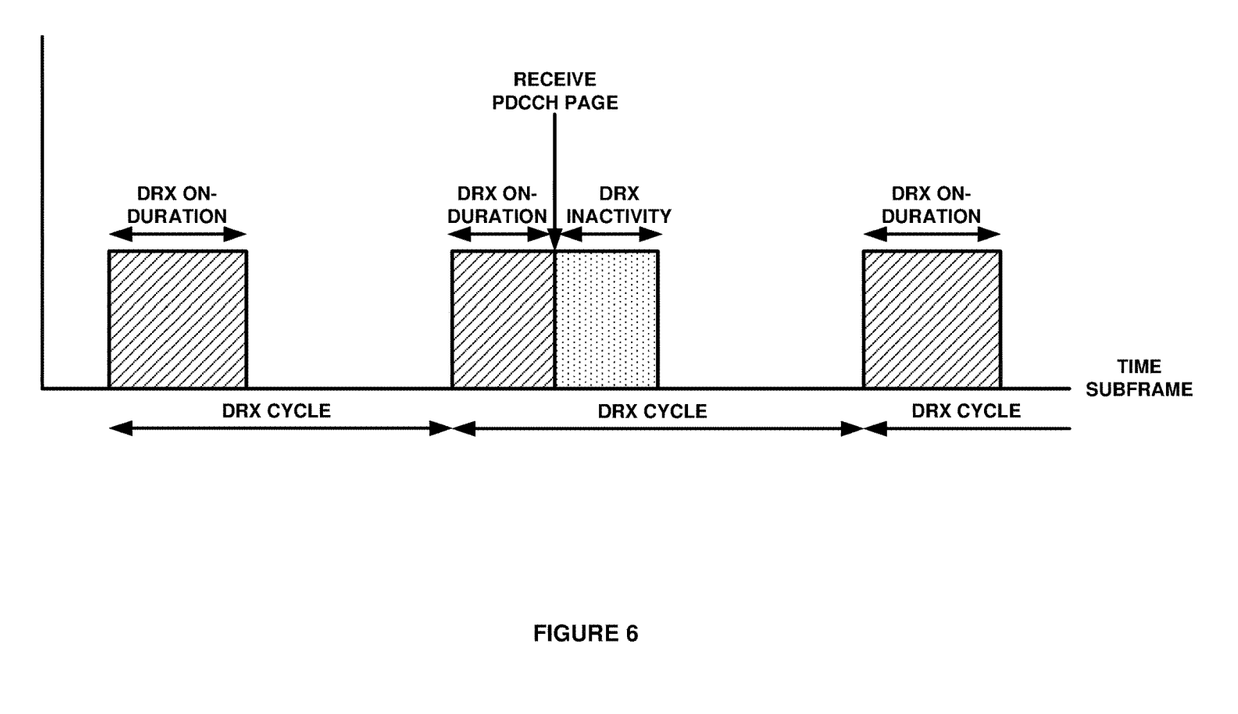
FIG. 6 illustrates a DRX graph to control DRX parameter for UE.

FIG. 6 illustrates a DRX graph to control DRX parameter for UE. As shown by the stripped subframes, the DRX On-Duration timer is initiated each DRX time cycle to where the wireless receiver for the UE is turned on to listen for DCI from the wireless access network. Once UE receives the PDCCH page with the DCI data, the DRX Inactivity timer is initiated which starts a timer for how long the UE wireless receiver remains on after receiving the PDCCH page. This this example, the DRX Inactivity timer extends the amount of time the UE wireless receiver remains on than when simply being on for the duration of the DRX On-Duration timer. Although not shown in the graph, a DRX Retransmission timer may also be included to indicate the maximum number of consecutive PDCCH subframes the UE wireless receiver remains active to wait for retransmissions after the first available retransmission time.

Figure 7:
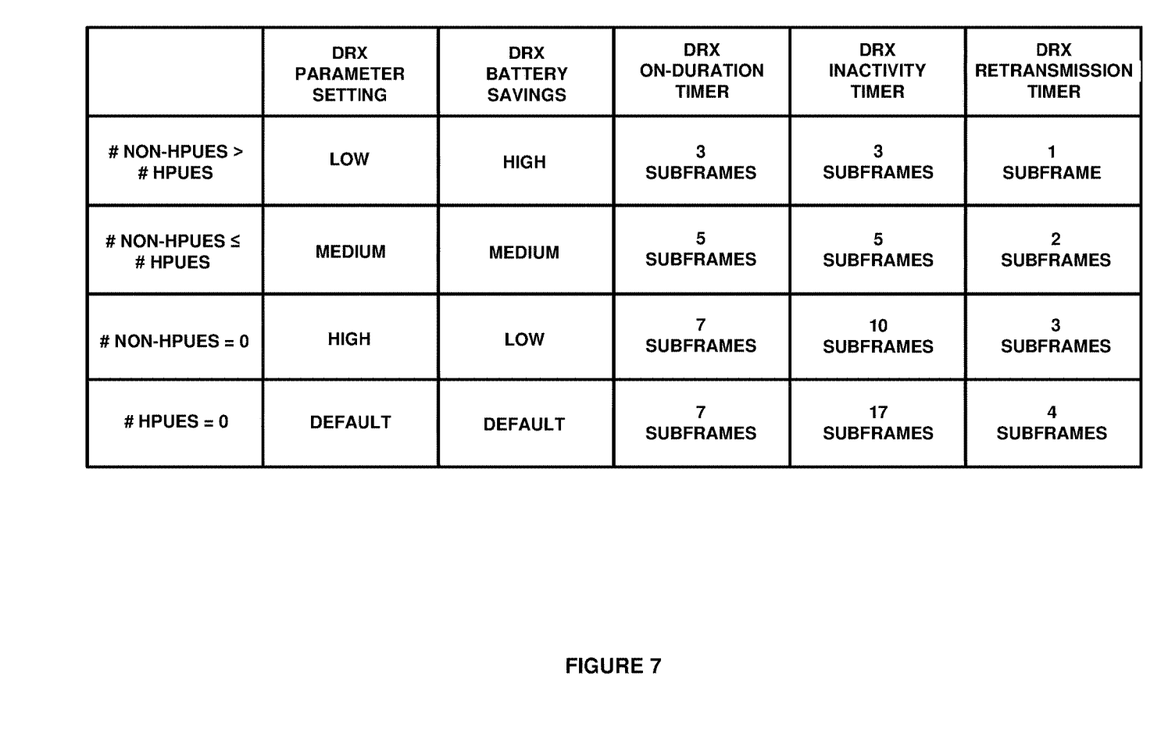
FIG. 7 illustrates a table of DRX parameters for UE.

FIG. 7 illustrates a table of DRX parameters for UEs. As indicated on the table, when the number of non-HPUEs experiencing RF interference above an RF interference threshold exceeds the number of HPUEs, the DRX parameters for the HPUEs are set to low which results in high battery power savings and the shortest DRX timers, such as a DRX On-Duration timer of 3 subframes, a DRX Inactivity timer of 3 subframes, and a DRX Retransmission timer of 1 subframe.

When the number of non-HPUEs experiencing RF interference above an RF interference threshold does not exceed the number of HPUEs but there are still one or more non-HPUEs experiencing RF interference above an RF interference threshold, the DRX parameters for the HPUEs are set to medium which results in medium battery power savings. Therefore, the DRX timers are shorter than the high DRX parameter setting and the default DRX parameter setting, but longer than the low DRX parameter setting. In this example, the DRX parameters include a DRX On-Duration timer of 5 subframes, a DRX Inactivity timer of 5 subframes, and a DRX Retransmission timer of 2 subframes.

When there are no non-HPUEs experiencing RF interference above an RF interference threshold the DRX parameters for the HPUEs are set to high which results in low battery power savings. Therefore, the DRX timers are still shorter than the default DRX parameter setting, but longer than the low DRX parameter setting and the medium DRX parameter setting. In this example, the DRX parameters include a DRX On-Duration timer of 7 subframes, a DRX Inactivity timer of 10 subframes, and a DRX Retransmission timer of 3 subframes.

When there are no HPUEs that have enabled the higher maximum output power, the DRX parameters for the HPUEs are set to the default parameter settings which results in default (lowest) battery power savings. Therefore, the DRX timers are longer than the low DRX parameter setting, the medium DRX parameter setting, and the high DRX parameter setting. In this example, the DRX parameters include a DRX On-Duration timer of 7 subframes, a DRX Inactivity timer of 17 subframes, and a DRX Retransmission timer of 4 subframes.

Figure 8:
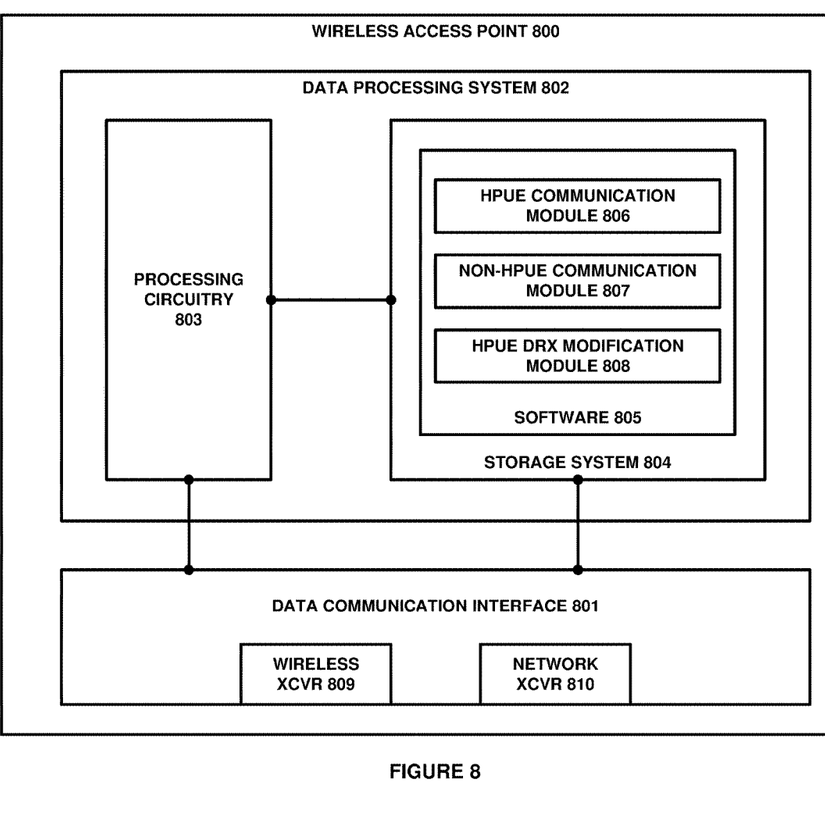
FIG. 8 illustrates a wireless access point to control DRX parameters for UE.

FIG. 8 illustrates wireless access point 800 to DRX parameters for UEs. Wireless access point 800 is an example of wireless access point 120 and eNodeB 420, although wireless access point 120 and eNodeB 420 may use alternative configurations and operations. Wireless access point 800 comprises data communication interface 801 and data processing system 802. Data communication interface 801 comprises wireless transceiver 809 and network transceiver 810. Data processing system 802 comprises processing circuitry 803 and storage system 804. Storage system 804 stores software 805. Software 805 includes respective software modules 806-809.

Wireless transceiver 809 comprises wireless communication components, such as antennas, amplifiers, filters, modulators, digital signal processors, bus interfaces, memory, software, and the like. Network transceiver 810 may comprise wireless and/or wireline communication components, such as ports, bus interfaces, digital signal processors, antennas, amplifiers, filters, modulators, memory, software, and the like. Processing circuitry 803 comprises server blades, circuit boards, bus interfaces, integrated circuitry, and associated electronics. Storage system 804 comprises non-transitory, machine-readable, data storage media, such as flash drives, disc drives, memory circuitry, data servers, and the like. Software 805 comprises machine-readable instructions that control the operation of processing circuitry 803 when executed. Wireless access point 800 may be centralized or distributed. All or portions of software modules 806-808 may be externally stored on one or more storage media, such as circuitry, discs, and the like. Some conventional aspects of wireless access point 800 are omitted for clarity, such as power supplies, enclosures, and the like.

When executed by processing circuitry 803, HPUE communication module 806 directs circuitry 803 to drive data communication interface 801 to exchange wireless communications with HPUEs. When executed by processing circuitry 803, HPUE communication module 806 directs circuitry 803 to determine a number of the HPUEs. When executed by processing circuitry 803, non-HPUE communication module 807 directs circuitry 803 to drive data communication interface 801 to exchange wireless communications with non-HPUEs. When executed by processing circuitry 803, non-HPUE communication module 806 directs circuitry 803 to determine a number of the non-HPUEs experiencing RF interference above an RF interference threshold.

When executed by processing circuitry 803, HPUE DRX modification module 808 directs circuitry 803 to compare the number of non-HPUEs experiencing RF interference above the RF interference threshold to the number of HPUEs and when the number of non-HPUEs experiencing RF interference above the RF interference threshold exceeds the number of HPUEs, then modifying DRX parameters for the HPUEs to a low DRX parameter setting. When executed by processing circuitry 803, HPUE DRX modification module 808 also directs circuitry to drive data communication interface 801 to wirelessly transmit an instruction to the HPUEs indicating the medication of the DRX parameters for the HPUEs to the low DRX parameter setting.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a wireless access point to control Discontinuous Reception (DRX) parameters for User Equipment (UE), the method comprising:
    wirelessly exchanging wireless communications with a plurality of UEs comprising High Power UEs (HPUEs) and non-HPUEs;
    determining a number of the HPUEs;
    determining a number non-HPUEs experiencing RF interference above an RF interference threshold;
    comparing the number of non-HPUEs experiencing RF interference above the RF interference threshold to the number of HPUEs and when the number of non-HPUEs experiencing RF interference above the RF interference threshold exceeds the number of HPUEs, then modifying DRX parameters for the HPUEs to a shorter DRX cycle timer setting; and
    wirelessly transmitting an instruction to the HPUEs indicating the modification of the DRX parameters for the HPUEs to the shorter DRX cycle timer setting, wherein the DRX cycle timer setting comprises at least one of an On-Duration timer setting, a DRX Inactivity timer setting, and a DRX-Retransmission timer setting within the cycle timer.

2. The method of claim 1 further comprising:
    comparing the number of non-HPUEs experiencing RF interference above the RF interference threshold to the number of HPUEs and when the number of non-HPUEs experiencing RF interference above the RF interference threshold does not exceed the number of HPUEs, then modifying the DRX parameters for the HPUEs to a medium DRX cycle timer setting; and
    wirelessly transmitting an additional instruction to the HPUEs indicating the modification of the DRX parameters for the HPUEs to the medium DRX cycle timer setting.

3. The method of claim 1 further comprising:
    determining that no non-HPUEs are experiencing RF interference above the RF interference threshold and responsively modifying the DRX parameters for the HPUEs to a longer DRX cycle timer setting; and
    wirelessly transmitting an additional instruction to the HPUEs indicating the modification of the DRX parameters for the HPUEs to the longer DRX cycle timer setting.

4. The method of claim 1 further comprising:
    determining that none of the HPUEs are HP enabled and responsively modifying the DRX parameters for the HPUEs to a default DRX cycle timer setting; and
    wirelessly transmitting an additional instruction to the HPUEs indicating the modification of the DRX parameters for the HPUEs to the default DRX cycle timer setting.

5. The method of claim 1 wherein wirelessly transmitting the instruction to the HPUEs indicating the modification of the DRX parameters for the HPUEs to the shorter DRX cycle timer setting comprises wirelessly transmitting the instruction to the HPUEs indicating the modification of the DRX parameters for the HPUEs to the shorter DRX cycle timer setting in a Radio Resource Control (RRC) message.

6. The method of claim 1 wherein the RF interference for each of the non-HPUEs comprises at least one of a Signal-to-Noise Ratio (SNR), a Reference Signal Received Power (RSRP), and a Reference Signal Received Quality (RSRQ) for the non-HPUEs.

7. The method of claim 1 wherein the wireless access point comprises a Long Term Evolution (LTE) evolved NodeB (eNodeB).

8. A wireless access point to control Discontinuous Reception (DRX) parameters for User Equipment (UE), the method comprising:
    a communication interface configured to wirelessly exchange wireless communications with a plurality of UEs comprising High Power UEs (HPUEs) and non-HPUEs;
    a processing system configured to determine a number of the HPUEs;

the processing system configured to determine a number non-HPUEs experiencing RF interference above an RF interference threshold;

the processing system configured to compare the number of non-HPUEs experiencing RF interference above the RF interference threshold to the number of HPUEs and when the number of non-HPUEs experiencing RF interference above the RF interference threshold exceeds the number of HPUEs, then modify DRX parameters for the HPUEs to a shorter DRX cycle timer setting; and the communication interface configured to wirelessly transmit an instruction to the HPUEs indicating the modification of the DRX parameters for the HPUEs to the shorter DRX cycle timer setting, wherein the DRX cycle timer setting comprises at least one of an On-Duration timer setting, a DRX Inactivity timer setting, and a DRX-Retransmission timer setting within the cycle timer.

9. The wireless access point of claim 8 further comprising:

the processing system configured to compare the number of non-HPUEs experiencing RF interference above the RF interference threshold to the number of HPUEs and when the number of non-HPUEs experiencing RF interference above the RF interference threshold does not exceed the number of HPUEs, then modify the DRX parameters for the HPUEs to a medium DRX cycle timer setting; and the communication interface configured to wirelessly transmit an additional instruction to the HPUEs indicating the modification of the DRX parameters for the HPUEs to the medium DRX cycle timer setting.

10. The wireless access point of claim 8 further comprising:

the data processing system configured to determine that no non-HPUEs are experiencing RF interference above the RF interference threshold and responsively modify the DRX parameters for the HPUEs to a longer DRX cycle timer setting; and the communication interface configured to wirelessly transmit an additional instruction to the HPUEs indicating the modification of the DRX parameters for the HPUEs to the longer DRX cycle timer setting.

11. The wireless access point of claim 8 further comprising:

the processing system configured to determine that none of the HPUEs are HP enabled and responsively modify the DRX parameters for the HPUEs to a default DRX cycle timer setting; and the communication interface configured to wirelessly transmit an additional instruction to the HPUEs indicating the modification of the DRX parameters for the HPUEs to the default DRX cycle timer setting.

12. The wireless access point of claim 8 wherein wirelessly the communication interface configured to transmit the instruction to the HPUEs indicating the modification of the DRX parameters for the HPUEs to the shorter DRX cycle timer setting comprises the communication interface configured to wirelessly transmit the instruction to the HPUEs indicating the modification of the DRX parameters for the HPUEs to the shorter DRX cycle timer setting in a Radio Resource Control (RRC) message.

13. The wireless access point of claim 8 wherein the RF interference for each of the non-HPUEs comprises at least one of a Signal-to-Noise Ratio (SNR), a Reference Signal Received Power (RSRP), and a Reference Signal Received Quality (RSRQ) for the non-HPUEs.

14. The wireless access point of claim 8 wherein the wireless access point comprises a Long Term Evolution (LTE) evolved NodeB (eNodeB).

* * * * *